3,299,059
1-TERTIARY AMINO-3-PHENYL-3-FURFURYL-4-LOWER ALKYL KETONES

Marcel Pesson, Paris, France, assignor to Laboratoire Roger Bellon, Neuilly-sur-Seine, France, a company of France
No Drawing. Filed Nov. 4, 1963, Ser. No. 321,363
Claims priority, application Great Britain, Nov. 7, 1962, 42,154/62
6 Claims. (Cl. 260—247.7)

This invention relates to amino-ketones, their preparation, and compositions containing them.

The invention provides new amino-ketones, corresponding to Formula I:

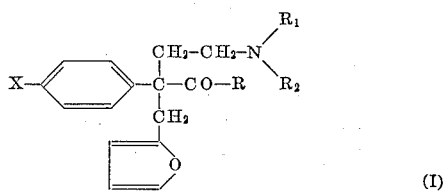

and their acid addition salts, in which X represents halogen, preferably chlorine, or hydrogen, R represents alkyl containing up to 6 carbon atoms, and $R_1$ and $R_2$ which may be the same or different radicals, represent alkyl containing, up to 4 carbon atoms which may, with the nitrogen atom to which they are attached, form a saturated, mononuclear heterocyclic ring, such as the pyrrolidino, piperidino, or morpholino ring.

These compounds have a particularly interesting antitussive activity and also show spasmolytic activity. The invention consequently includes within its scope pharmaceutical compositions containing one or more of the aforesaid new amino-ketones, as much or in the form of their non-toxic acid addition salts, together with a pharmaceutically acceptable non-toxic carrier compatible therewith.

The invention also provides a process for the preparation of the compounds of Formula I which comprises reacting an organomagnesium compound of the Formula R-Mg Br with a propionitrile of Formula II:

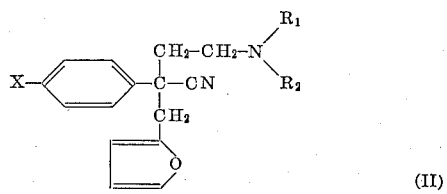

wherein X, R, $R_1$ and $R_2$ are as hereinbefore defined, and hydrolyzing the resulting imine, for instance, with an acid such as hydrochloric acid, to give the desired ketone of Formula I. The nitriles of Formula II are described in our copending application Serial No. 308,089.

The reaction may be represented as follows:

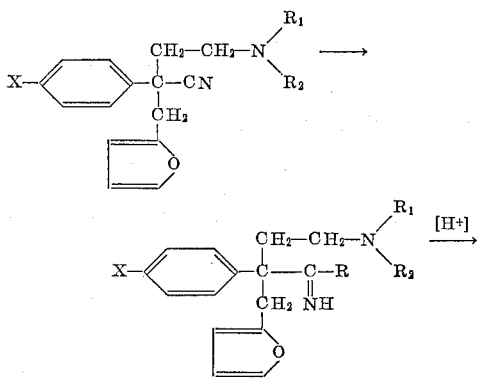

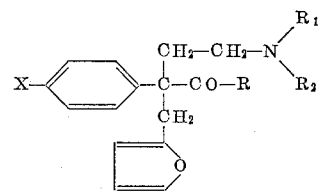

The reaction of the organomagnesium compound with the nitrile is preferably carried out in an aromatic solvent such as benzene, xylene or toluene, the last being preferred, the reaction mixture being heated under reflux until the reaction is substantially complete (for example, for 6 to 10 hours).

The magnesium complex which is formed is preferably decomposed with 3 N hydrochloric acid; the intermediate imine then enters the aqueous solution. The mixture is finally heated on a water bath (preferably for about 3 hours) in order to complete the hydrolysis. The latter operation has to be carried out with care because of the sensitivity of the furan ring to acid reagents.

When the hydrolysis is completed, it is preferred to add tartaric acid to the hot solution which is then made alkaline, for example with sodium hydroxide solution. An oil is thus obtained which can be extracted with a solvent such as ether. Finally, the extract is dried, the solvent driven off and the residue fractionated in vacuo. The tartaric acid prevents the precipitation of magnesia by the alkali, which would cause difficulties on subsequent extraction.

The compounds of the invention are obtained in the form of viscous oils which can be distilled in a high vacuum. Some of the new compounds readily give crystalline salts.

The following non-limitative examples illustrate the invention.

EXAMPLE 1

*1-dimethylamino-3-phenyl-3-furfuryl-4-hexanone*

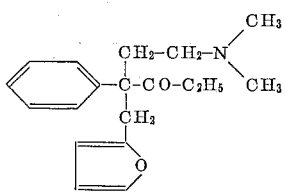

To a solution of ethyl magnesium bromide prepared from 3.6 g. of magnesium and 16.3 g. of ethyl bromide in 60 cc. of diethyl ether, there is added under a nitrogen atmosphere a solution of 26.8 g. of α-(2-dimethylaminoethyl)-α-phenyl-β-(2-furyl)-propionitrile in 150 cc. of anhydrous toluene. The reaction flask is equipped with a Vigreux column and a condenser. The mixture is stirred, always in a nitrogen atmosphere, and is heated to distill off the diethyl ether. When the temperature of the vapor reaches the boiling point of toluene, the Vigreux column is replaced by a reflux condenser and heating is continued for 6 hours under reflux, always while stirring and in a nitrogen atmosphere. The mixture is then cooled in an ice bath and 130 cc. of 3 N hydrochloric acid are added. The acid solution is separated and heated on a water bath for two hours while stirring. 45 g. of tartaric acid are added thereto and the solution is stirred until the acid has dissolved. After cooling, the acid solution is extracted with diethyl ether in order to remove neutral impurities, and then made alkaline by adding sodium hydroxide solution. The oil which separates is extracted with ether, and the ethereal phase is washed with water and dried over magnesium sulfate. The solvent is removed from the dried extract by heating on a water bath and the residue is fractionated in vacuo 14.7 g. of an oil are obtained which boils at 154–156° C./0.2 mm. Hg.

*Analysis.*—Calculated for $C_{19}H_{25}NO_2$: C percent= 76.22, H percent=8.42, N percent=4.68. Found: C percent=76.07, H percent=8.45, N percent=4.65.

The base gives a hydrochloride which melts at 206° C.

EXAMPLE 2

*1-N-morpholyl-3-phenyl-3-furfuryl-4-hexanone*

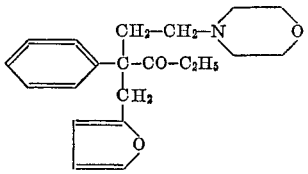

This ketone was prepared by the procedure described in Example 1, starting from α-(N-morpholyl-ethyl)-α-phenyl-β-(2-furyl)-propionitrile. It is an oil which boils at 186–191° C./0.09 mm. Hg.

*Analysis.*—Calculated for $C_{21}H_{27}NO_3$: C percent= 73.87, H percent=7.97, N percent=4.10. Found: C percent=73.50, H percent=8.46, N percent=4.06.

The hydrochloride of the base melts at 202° C.

EXAMPLE 3

*1-N-pyrrolidyl-3-phenyl-3-furfuryl-4-hexanone*

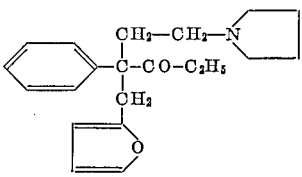

This ketone was prepared by following the procedure described in Example 1, starting from α-(N-pyrrolidyl-ethyl)-α-phenyl-β-(2-furyl)-propionitrile. It is obtained as an oil which boils at 185–189° C./0.4 mm. Hg.

*Analysis.*—Calculated for $C_{21}H_{27}NO_2$: C percent= 77.50, H percent=8.36, N percent=4.30. Found: C percent=77.40, H percent=8.84, N percent=4.38.

Its hydrochloride melts at 187° C.

EXAMPLE 4

*1-dimethylamino-3-p-chlorophenyl-3-furfuryl-4-hexanone*

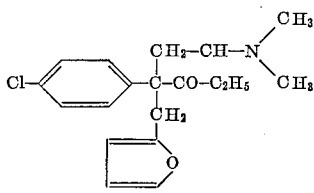

This substance is obtained by following the procedure described in Example 1, starting from α-(2-dimethylamino - ethyl) - α - (p-chlorophenyl)-β-(2-furyl)-propionitrile. It is an oil which boils at 176–178° C./0.3 mm. Hg, and gives a hydrochloride which melts at 218° C. Analysis of the hydrochloride:

Calculated for $C_{19}H_{24}ClNO_2 \cdot HCl$: C percent=61.62, H percent=6.75, N percent=3.78, Cl percent=19.18. Found: C percent=61.07, H percent=6.99, N percent= 3.82, Cl percent=19.18.

EXAMPLE 5

*1-dimethylamino-3-phenyl-3-furfuryl-4-octanone*

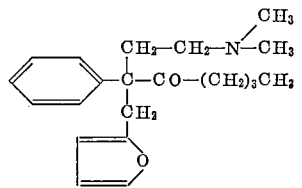

This compound was prepared by following the procedure described in Example 1, by the action of butylmagnesium bromide on α-phenyl-α-(2-dimethylaminoethyl)-β-(2-furyl)-propionitrile. It is an oil which boils at 154° C./0.88 mm. Hg.

*Analysis.*—Calculated for $C_{21}H_{29}NO_2$: C percent= 77.02, H percent=8.93, N percent=4.28. Found: C percent=76.65, H percent=9.38, N percent=4.23.

EXAMPLE 6

*1-dimethylamino-3-phenyl-3-furfuryl-4-pentanone*

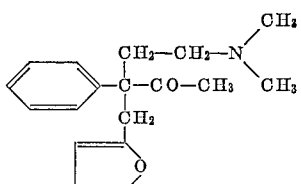

This ketone was prepared by following the procedure described in Example 1, by the action of methylmagnesium iodide on α - phenyl - α - (2-dimethylaminoethyl)-β-(2-furyl)-propionitrile. The base is an oil which boils at 134° C./0.08 mm. Hg.

*Analysis.*—Calculated for $C_{18}H_{23}NO_2$: C percent= 75.75, H percent=8.12, N percent=4.91. Found: C percent=76.20, H percent=8.29, N percent=4.72.

EXAMPLE 7

*1-dimethylamino-3-phenyl-3-furfuryl-4-heptanone*

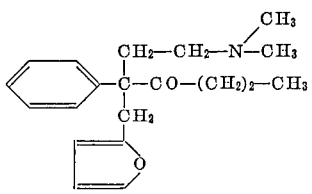

This ketone was prepared by following the procedure described in Example 1, starting from proplymagnesium bromide and α-phenyl-α-(2-dimethylaminoethyl)-β-(2-furyl)-propionitrile. It is a viscous oil which boils at 136° C./0.08 mm. Hg.

*Analysis.*—Calculated for $C_{20}H_{27}NO_2$: C percent= 76.64, H percent=8.68, N percent=4.47. Found: C percent=76.52, H percent=8.86, N percent=4.40.

When administered intravenously in the mouse, the hydrochlorides of 1-dimethylamino-3-phenyl-3-furfuryl-4-hexanone (product A, described in Example 1), 1-N-morpholyl-3-phenyl-3-furfuryl-4-hexanone (product B, described in Example 2), 1-N-pyrrolidyl-3-phenyl-3-furfuryl-4-hexanone (product C, described in Example 3), 1-dimethylamino-3-phenyl-3-furfuryl-4-pentanone (product D, described in Example 6), and 1-dimethylamino-3-phenyl-3-furfuryl-4-heptanone (product E, described in Example 7) show $LD_{50}$ values of 50, 55, 50, 50 and 27 respectively.

The following tests shows the antitussive effect of the new compounds:

(1) Laryngeal nerve test in the cat:

The test involves the electrical stimulation of the superior layrngeal nerve of the cat (Domenjoz technique).

A cat is anesthetized by intraperitoneal injection of 25 mg./kg. of Nembutal and its superior laryngeal nerves are carefully dissected. The nerve is then stimulated electrically at the rate of 5 to 10 per second for 5 to 10 seconds, the excitations (0.5 to 1 volt) being repeated for periods of at least 2 minutes.

The movements of the abdominal region corresponding to breathing and attacks of coughing are recorded by means of a Marey device. The antitussive activity of the administered substance is evaluated by observing the dose of compound under test which causes disappearance of these phenomena. The results are given in Table I below.

(2) Mechanical excitation tests on the traches of the guinea pig.

Guinea pigs are anesthetized by intraperitoneal injection of 25 mg./kg. of Nembutal. A tracheotomy is carried out and the tracheal epithelium is excited mechanically with a hair.

The dose of substance which prevents the occurrence of fits of coughing is determined for each of the compounds under test. Table I below gives the doses found for the compounds tested.

(3) Sulfuric acid aerosol test:

The coughing attacks caused by the inhalation of irritant sulfuric acid vapor were compared before and after the injection of the compounds investigated. For this purpose batches of 5 to 10 guinea pigs weighing from 300 to 350 g. each were employed. They were subjected twice, with an interval of one hour between treatments, to the action of half-normal or normal sulfuric acid.

By administering pre-determined doses of the substances under test, the dose was determined which suppressed completely the sensitivity of the guinea pigs to the aerosols. Table I below shows the required doses.

The spasmolytic activity was also examined by the acetylcholine and barium chloride tests.

A spasm was caused in an isolated rat duodenum, placed in an oxygenated Tyrode solution at 37° C., either by administering acetylcholine at a concentration of about $10^{-7}$ or barium chloride at a concentration of $10^{-4}$. After washing the duodenum, the dose of the solution under investigation was determined which prevented the occurrence of fresh spasms.

The following Table I shows the concentrations of compounds A to E necessary to reduce by one-half the spasms caused by the one or the other of the stated spasmogenic compounds.

*Table I*

| Compound under test | Antitussive action (doses in mg./Kg. suppressing coughing) | | | Spasmolytic action | |
|---|---|---|---|---|---|
| | Test on the laryngeal nerve of a cat | Excitation of the trachea of a guinea pig | Sulfuric acid aerosol | Acetylcholine | Barium chloride |
| A | 2.5 | 5 | | $6.10^{-6}$ | $6.10^{-6}$ |
| B | 5 | | | | |
| C | 5 | 5 | 5 | $3.10^{-6}$ | $6.10^{-6}$ |
| D | 5 | | | $2.10^{-6}$ | $6.10^{-6}$ |
| E | 2.5-4 | | | $3.10^{-6}$ | $6.10^{-6}$ |

The potentiation of narcosis induced by hexobarbital caused by the compounds of the invention has also been studied. Compound C, administered intraperitoneally in a dose between 25 and 50 mg./kg., produces a very marked potentiation.

Finally, the diuretic action of the new compounds has been studied by the Lipschitz method in the rat receiving overdoses of water. The results obtained with oral doses of 25 and 50 mg./kg. expressed as percentage increases in diuresis as compared with untreated controls are given in Table II below:

*Table II*

| Compound under test | Oral dose, mg./kg. | Percent Increase in diuresis |
|---|---|---|
| B | 50 | 22 |
| C | 50 | 73 |
| | 50 | 71 |
| C | 25 | 63 |
| | 25 | 63 |

The result with compound C was confirmed on intravenous administration in the rabbit.

I claim:
1. 1-dimethylamino-3-phenyl-3-furfuryl-4-hexanone.
2. 1-morpholino-3-phenyl-3-furfuryl-4-hexanone.
3. 1-pyrrolidino-3-phenyl-3-furfuryl-4-hexanone.
4. 1 - dimethylamino - 3 - p - chlorophenyl - 3 - furfuryl-4-hexanone.
5. 1-dimethylamino-3-phenyl-3-furfuryl-4-octanone.
6. An aminoketone selected from the group consisting of an aminoketone of the formula

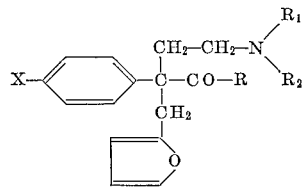

wherein
X is a member selected from the group consisting of hydrogen and halogen;
R is alkyl with 1 to 6 carbon atoms; and
$R_1$ and $R_2$ are members selected from the group consisting of alkyl with 1 to 4 carbon atoms; and
$R_1$ and $R_2$ together with the nitrogen atom to which they are attached, form the pyrrolidino, piperidino, and morpholino ring,
and its pharmaceutically acceptable acid addition salts.

References Cited by the Examiner

Dupre et al.: J. Chem. Society, Part I, pp. 500–510, only page 510 relied on, (1949).

ALEX MAZEL, *Primary Examiner.*

HENRY R. JILES, J. TOVAR, *Assistant Examiners.*